Dec. 25, 1962  J. DEZZANI  3,070,057
FEEDER FOR FILAMENTOUS MATERIAL
Filed July 13, 1959  2 Sheets-Sheet 2
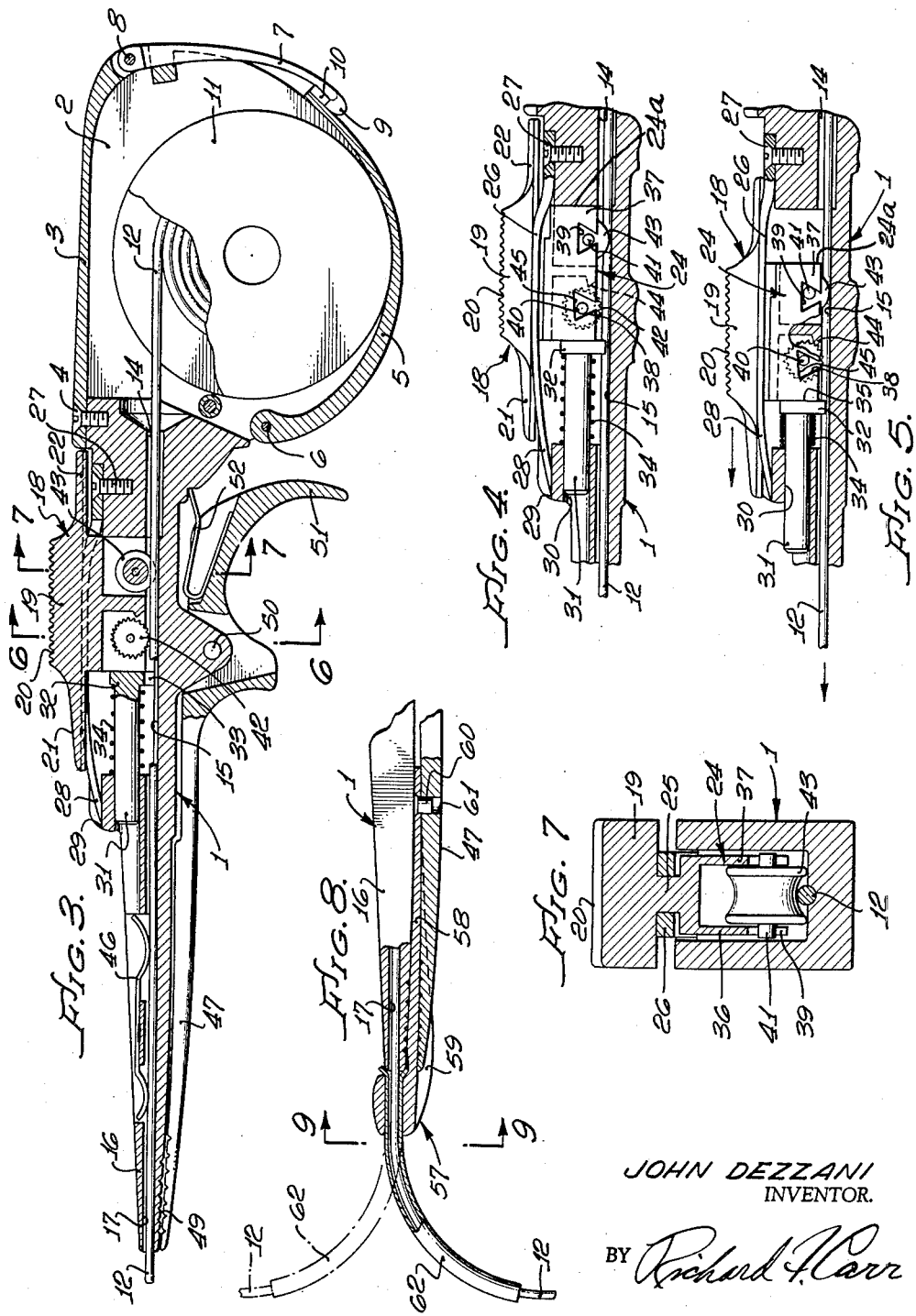
JOHN DEZZANI
INVENTOR.
BY Richard F. Carr
ATTORNEY.

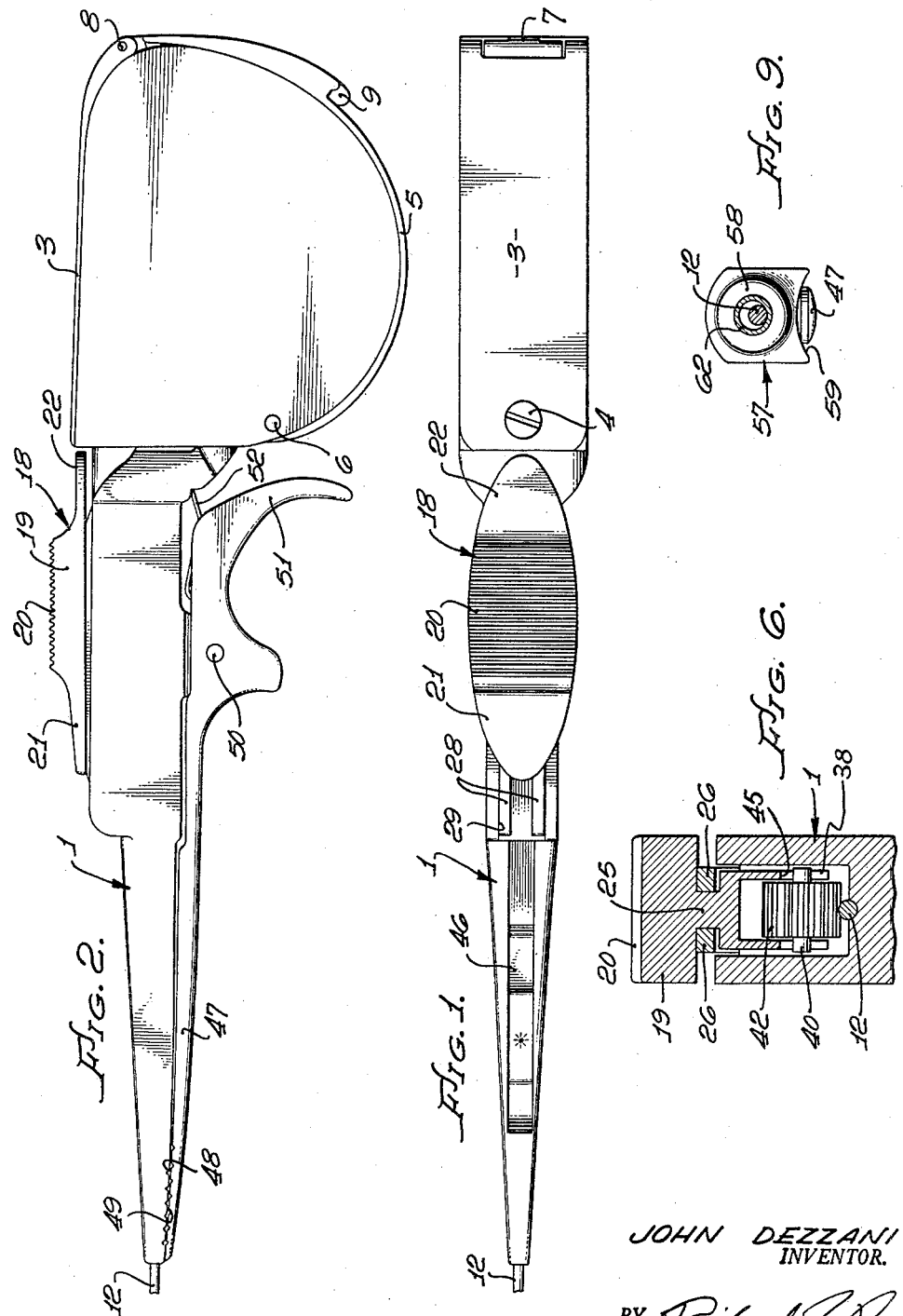

United States Patent Office 3,070,057
Patented Dec. 25, 1962

3,070,057
FEEDER FOR FILAMENTOUS MATERIAL
John Dezzani, Lynwood, Calif.
(8006 Otis St., Huntington Park, Calif.)
Filed July 13, 1959, Ser. No. 826,558
11 Claims. (Cl. 113—111)

This invention pertains to a feeder for filamentous material which is particularly adapted for progressively feeding increments of solder.

It is an object of this invention to provide a device for retaining a quantity of filamentous material and permitting the advancement of such material in discrete amounts as desired.

Another object of this invention is to provide a feeder for filamentous material which is compact, light weight, and easily handled, as well as being economical to manufacture.

A further object of this invention is to provide a feeder which will firmly hold the solder or other filamentous material which it advances.

An additional object of this invention is to provide a solder feeding device which will allow for reverse movement of the solder to return it to the housing of the device as desired.

A still further object of this invention is to provide a solder-feeding device which includes a housing adapted to receive a wound reel of solder and includes a reciprocative slider carrying a ratchet wheel which locks against rotation when the slider is moved in one direction for engaging and advancing the solder from the housing, while being rotatable in the opposite direction when the reciprocative member is reversed so that the ratchet wheel will not be operative during such travel of the slider or upon reverse movement of the solder with respect to the housing.

These and other objects will become apparent from the following detailed description taken in connection with the accompanying drawing in which:

FIG. 1 is a top plan view of the device of this invention,

FIG. 2 is a side elevational view of the invention,

FIG. 3 is a longitudinal sectional view taken along line 3—3 of FIG. 1,

FIG. 4 is an enlarged fragmentary showing of the portion of the invention which includes the reciprocative member, with that member at the rearward end of the stroke and the toothed ratchet wheel in its rotatable position, FIG. 5 is an enlarged fragmentary view similar to FIG. 4 but with the reciprocative member at the forward end of its stroke, and the toothed ratchet wheel in the locked position for advancing the solder, FIG. 6 is an enlarged transverse sectional view taken along line 6—6 of FIG. 3, FIG. 7 is an enlarged transverse sectional view taken along line 7—7 of FIG. 3 showing the position of the guide roller with respect to the solder in the housing, FIG. 8 is an enlarged fragmentary view of the nose portion of the invention with an adapter in place for providing angular positioning of solder fed from the housing, and FIG. 9 is a sectional view taken along line 9—9 of FIG. 8.

As shown in the drawing, the device of this invention includes an elongated body 1 having a storage compartment 2 at one end thereof. This compartment is defined by an upper wall 3 secured to the remainder of housing by screw 4, together with a lower wall 5 pivoted by pin 6 to the housing. Lock member 7 is pivotally connected by pin 8 to wall 3 and includes a detent 9 for engaging a shoulder 10 at the end of wall 5. By this arrangement, compartment 2 may be opened by loosening detent 9 from shoulder 10 and swinging members 5 and 7 apart. This permits the compartment to receive spool 11 around the hub of which is wound a quantity of solder 12. Alternatively, the solder may be wound into a coil, omitting the spool. For a relatively rigid material, such as silver solder, a shorter straight length of the material may be inserted into the storage compartment.

The solder from spool 11 passes through opening 14 into guide channel 15 of the housing. This channel extends to nose portion 16 of the housing where the solder may be fed through opening 17 to the exterior of the housing.

Disposed above channel 15 at the intermediate portion of the housing is a reciprocative member or slider 18. The upper section of slider 18 includes a central portion 19 provided with suitable serrations 20 for permitting manual operation of this member and from which extend elongated fore and aft portions 21 and 22. Depending portion 24 extends from reciprocative member 18 beneath section 19, connecting to the upper portion through section 25 of reduced diameter. A bifurcated member 26, which may be a deflectable leaf spring, receives portion 25 of the slider retaining the slider and allowing limited lateral movement of the slider toward and away from the guide channel 15. Retainer 26 is secured to the housing by screw 27 at the rearward end of this member while forward end 28 engages flat surface 29 of the housing and is freely slidable thereon.

Cylindrical opening 30 in the housing above guide channel 15 receives one end of a plunger 31 which is included to bias the slider rearwardly. The opposite end of plunger 31 includes an enlargement 32 the lower edge of which rests on the housing on either side of channel 15, being recessed at 33 to avoid interference with the solder within the channel. A spring 34 surrounds plunger 31 and engages enlargement 32, thereby forcing the end of the plunger against end wall 35 of the lower portion 24 of reciprocative member 18. This urges member 18 toward its rearward position which is shown in FIGS. 3 and 4.

Lower portion 24 of the reciprocative member includes parallel spaced side walls 36 and 37 which are provided with opposed notches 38 and 39. These openings receive and retain the journals 40 and 41 of a toothed ratchet wheel 42 and a flanged guide roller 43. Notches 38 and 39 are constricted at their lower edges so that upon assembly the journals 40 and 41 may be forced into the notches, but will be retained therein once they have passed these edges. The notches diverge upwardly so that wheels 42 and 43 are free for limited movement therein.

Extending transversely of reciprocative member 18 adjacent and rearwardly of ratchet wheel 42 is a forwardly projecting knife-edged abutment 44. This member acts as a stop to prevent rotation of ratchet wheel 42 when the device is operated, as will be made more clear hereinafter.

In advancing solder from the housing 1 of the device of this invention, the housing may be held in one hand with slider 18 operated by the thumb engaging serrations 20. Member 18 simply is pushed downwardly and slid forwardly to move an increment of solder beyond nose 16 ready for use. As slider 18 is moved downwardly with respect to the housing, journals 40 of ratchet wheel 42 are brought into engagement with top edges 45 of notches 38. The exertion of slight downward pressure in this manner forces the teeth of the ratchet wheel into the upper surface of the solder in channel 15. Forward movement of the slider causes the ratchet wheel to shift rearwardly with respect to the slider within notches 38. This brings ratchet wheel 42 toward the rearward edges of the notches into engagement with abutment 44 so that the latter element will enter the root portions of the teeth about the periphery of the wheel. Abutment 44 thereby acts as a stop and precludes rotational movement of the ratchet wheel. Surfaces 45 of the notches 38 are inclined upwardly to the rear to facilitate this movement and action of the ratchet wheel. In this manner, the ratchet wheel firmly grips the solder, while at the same time it is precluded from rotation with respect thereto. By constructing retainer 26 as a leaf spring, the slider may be secured to the housing without undue lateral movement with respect thereto, yet still accommodate solder of different diameters. In other words, the clearance between member 26 and the slider at connecting portion 25 may be relatively small, yet by deflecting member 26 the ratchet wheel may be brought into griping engagement with the solder even if the solder is of relatively narrow diameter.

As the slider 18 then is shifted to its forward position of FIG. 5, the ratchet wheel, by gripping the solder and being held against rotation, advances the solder, sliding it through channel 15 and out of the nose portion through opening 17. Moving the slider through its stroke, therefore, moves an increment of solder from the nose which is equal in length to the travel given to the reciprocative member. During this movement of the reciprocative member, roller 43 engages the housing on either side of channel 15 (see FIG. 7) supporting the rear portion of the slider and assuring that the solder will not disengage channel 15, but without affording opposition to the movement of the solder through the channel.

After the slider 18 has moved to the forward end of its stroke, it merely is released whereupon spring 34, acting through plunger 31, forces the slider rearwardly to its original position. As this rearward movement takes place, ratchet wheel 42 shifts forwardly with respect to the slider, moving the ratchet wheel away from abutment 44 toward the forward edges of notches 38 so that it is free to rotate. This means that when the slider is retracted, the rotatable ratchet is released from the solder and will not tend to move the solder in a reverse direction. The end 24a of the lower portion of slider 18, by engaging the housing adjacent openiong 14, limits the rearward movement of the slider.

Therefore, all that is required in advancing a desired quantity of solder is to move the slider in one direction with the return action of the reciprocative member being automatic. The ratchet wheel likewise is automatically locked for advancing the solder in one direction and released for free rotation in the opposite direction.

The floating action of the ratchet wheel has a further advantage in that it allows the solder to be returned to the housing in the event that an excess is fed out through the nose of the housing. If the solder merely is pushed back into the housing, the reaction of the solder traveling in the reverse direction through channel 15 will tend to rotate ratchet wheel 42 away from the abutment so that there is no restriction to the movement of the solder. The device of this invention is much more versatile and practical because of this feature.

As the solder is fed from the nose of the housing, it is held firmly by a leaf spring 46 which urges the solder against the bottom of the channel and of opening 17. This is important in enabling precise positioning of the solder for a soldering operation. At the same time, the leaf spring does not interfere with the desirable large clearances found in the other portions of the device which assure that the solder does not meet with excessive friction during its movement. Actually, commercially available solder is non-uniform in its diameter so that unless clearance openings were employed, it would inevitably bind within the housing preventing its advancement.

As an added feature for facilitating the use of the device of this invention, a movable clamping member 47 is provided beneath the nose portion of the housing. Suitable serrations 48 and 49 may be provided in member 47 and on the lower portion of the nose of the housing which cooperate to provide a pair of jaws. Member 47 is pivoted to the housing by pin 50 and may be opened by a trigger 51, while it is biased by leaf spring 52 to a closed position. This jaw arrangement provides a convenient means for gripping wire or other object preparatory to a soldering operation.

As a further use of the movable jaw 47 it may be used in securing an adapter 57 to the nose of the housing for feeding the solder in an angular relationship with respect to the housing. Adapter 57 includes a support 58 recessed at 59 to receive the end of jaw 47, and provided with a depending pin 60 extending into aperture 61 of the jaw to index the adapter with respect to the housing. A tubular member 62 is held by support 58 adjacent opening 17 from which it receives the solder. Tube 62 guides the solder in a curved path which may be generally to a direction at ninety degrees with respect to the axis of the housing, as illustrated in FIG. 8. Tubular member 62 preferably is rotatable within body 58 of the adapter so that it may be swung around in any direction. The adapter is very simple to install or remove merely by operating trigger 51 and sliding it in or out of engagement with the jaws.

It may be seen from the foregoing that the solder feeder of this invention is simple to operate, positive in its action, and adaptable to a variety of uses. The solder is held firmly for use, yet is retractable in the housing as desired. The latter feature is made possible only through the provision of the floating ratchet wheel in the reciprocative member.

The foregoing detailed description is to be clearly understood as given by way of illustration and example only, the spirit and scope of this invention being limited solely by the appended claims.

I claim:

1. A device for progressively advancing a filamentous member comprising a guide means for receiving a length of a filamentous member, a reciprocative member adjacent said guide means and movable through a stroke substantially parallel to said guide means, a toothed member, means rotatably mounting said toothed member on said reciprocative member adjacent said guide means for engagement with a filamentous member in said guide means, abutment means on said reciprocative member, said mounting means for said toothed member including means for permitting limited translational movement of said toothed member to a first position in engagement with said abutment means whereby said abutment means precludes rotation of said toothed member, and a second position remote from said abutment means wherein said toothed member is rotatable, whereby when said toothed member so engages said abutment means said toothed member nonrotatably engages a filamentous member in said guide means for advancing said filamentous member, and when said toothed member is in said second position remote from said abutment means said toothed member by being rotatable is precluded from advancing a filamentous member in said guide means.

2. A device as recited in claim 1 in which said reciprocative member includes a duality of walls in spaced parallelism receiving said toothed member with the axis of said toothed member extending between said walls, said abutment means including a knife-edged element interposed between said walls adjacent said toothed member, said knife-edged element being receivable in the root portions of the teeth of said toothed member when said toothed member is in said one position, and remote from said root portions when said toothed member is in said second position.

3. A device as recited in claim 2 in which said mounting means for said toothed member includes journals projecting from said toothed member, said walls having opposed openings therethrough receiving said journals with freedom for limited movement with respect thereto, said openings for said journals including edge portions spaced to floatingly receive said journals and limiting the forward, the rearward and the upward movement of said journals, said abutment being adjacent said rearward edge portion, said reciprocative member being movable toward said guide means for reacting through said edge portions and said journals to urge said rotatable member against filamentous material in said guide means for causing said rotatable member to grip such filamentous material, and to cause said rotatable member to engage said abutment upon subsequent forward movement of said reciprocative member.

4. A device as recited in claim 3 including in addition resilient means biasing said reciprocative member away from said guide means.

5. A device for progressively advancing a filamentous member comprising a guide channel adapted to receive a length of a filamentous member, a reciprocative member adjacent and movable through a stroke substantially parallel to said channel, a wheel provided with teeth about the periphery thereof, mounting means floatingly and rotatably connecting said wheel to said reciprocative member with freedom for limited translational movement and engageable with said filamentous member, a fixed abutment on said reciprocative member, said mounting means including means for permitting said wheel to assume one translational position in which said fixed abutment engages the periphery of said wheel at the root portions of said teeth for thereby precluding rotation of said wheel, said mounting means including means for permitting said wheel to assume a second position remote from said abutment wherein said wheel is rotatable, said wheel being movable to said one position by said filamentous member when said reciprocative member is moved in one direction and movable to a position remote from said one position by said filamentous member when said reciprocative member is moved in the opposite direction.

6. A solder feeding device comprising a housing adapted to receive a quantity of filamentous solder, said housing having a guide channel therein for receiving a length of such solder and having an outlet through which said solder may be fed from said housing, a reciprocative member carried by said housing adjacent said channel, said reciprocative member being movable through a stroke substantially parallel to the axis of said channel, said reciprocative member being free for limited lateral movement toward and away from said channel, a guide roller rotatably carried by said reciprocative member on one side of said channel and adapted for engagement with solder received in said channel, a toothed wheel having a pair of journals projecting from the axis thereof, said reciprocative member including a slot means receiving said journals for thereby attaching said toothed wheel to said reciprocative member on said one side of said channel, said slot means allowing limited floating movement of said toothed wheel forwardly and rearwardly with respect to said reciprocative member, a fixed stop member on said reciprocative member engageable with root portions of said toothed wheel when said wheel is in the rearward position with respect to said reciprocative member, said stop member being remote from said wheel when said wheel is in the forward position with respect to said reciprocative member, and resilient means in said housing engaging said reciprocative member and urging the same to the end of its stroke remote from said outlet from said housing.

7. A device as recited in claim 6 including in addition a leaf spring normally holding said reciprocative member laterally away from said channel.

8. A device as recited in claim 6 including in addition resilient means adjacent said outlet for biasing said filamentous material laterally toward the surface of said guide channel for thereby precluding substantial lateral movement of said filamentous material at said outlet.

9. A device as recited in claim 6 in which said resilient means engaging said reciprocative member comprises a plunger in spaced parallelism with said guide channel, said housing having an opening slidably receiving one end of said plunger, said plunger having an enlargement at the other end thereof the end wall of which engages said reciprocative member, the bottom wall of which is in engagement with said housing on either side of said guide channel, and recessed adjacent said channel to provide a clearance opening for solder in said channel, and a spring interposed between said enlargement and said housing adjacent said opening for said plunger.

10. A device as recited in claim 6 including in addition a rigid guide member adjacent said outlet of said housing positioned to receive filamentous material from said housing, said guide member being pivotally adjustable to direct said filamentous material in different directions with respect to the axis of said channel.

11. A device as recited in claim 10 including in addition a clamping member pivotally connected to the exterior of said housing, and resilient means biasing said clamping member toward said housing exterior, said guide member including a support portion receivable between said clamping member and said housing exterior, and a curvilinear tubular member carried by said support member and positionable adjacent said outlet of said housing when said support member is so received for receiving said filamentous material from said housing.

References Cited in the file of this patent

UNITED STATES PATENTS

| | | |
|---|---|---|
| 364,778 | Seymour | June 14, 1887 |
| 655,196 | Church et al. | Aug. 7, 1900 |
| 2,228,291 | Weston | Jan. 14, 1941 |
| 2,444,267 | Pereira | June 29, 1948 |
| 2,604,064 | Sefton | July 22, 1952 |
| 2,833,904 | Cunningham | May 6, 1958 |
| 2,930,610 | Swartz | Mar. 29, 1960 |

FOREIGN PATENTS

| | | |
|---|---|---|
| 945,600 | Germany | July 12, 1956 |
| 584,641 | Great Britain | Jan. 20, 1947 |
| 541,707 | Italy | Apr. 7, 1956 |